(12) United States Patent
Bottari et al.

(10) Patent No.: US 6,406,758 B1
(45) Date of Patent: Jun. 18, 2002

(54) METHOD OF APPLYING A PROTECTIVE COATING TO A TOUCH SCREEN PANEL

(75) Inventors: Frank J. Bottari, Acton; Paul J. Richter, Chelmsford; Chia-Yen Li, Andover, all of MA (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/626,272

(22) Filed: Jul. 25, 2000

(51) Int. Cl.[7] .............................. B05D 3/06; B05D 5/12; B05D 3/02; B05D 5/06
(52) U.S. Cl. ..................... 427/557; 427/512; 427/515; 427/559; 427/162; 427/240; 427/397.7; 427/376.2; 427/420; 427/421; 427/428; 427/430.1
(58) Field of Search .................................. 427/512, 515, 427/557, 559, 162, 58, 240, 397.7, 376.2, 387, 420, 421, 428, 430.1

(56) References Cited

U.S. PATENT DOCUMENTS

| | | |
|---|---|---|
| 3,560,385 A | 2/1971 | Roth |
| 3,730,701 A | 5/1973 | Isquith et al. |
| 3,860,709 A | 1/1975 | Abbott et al. |
| 3,922,396 A * | 11/1975 | Speirs et al. ................. 427/250 |
| 4,198,539 A | 4/1980 | Pepper, Jr. |
| 4,288,357 A * | 9/1981 | Kanazawa et al. ..... 260/31.2 N |
| 4,293,734 A | 10/1981 | Pepper, Jr. |
| 4,316,041 A | 2/1982 | Totten et al. |
| 4,371,746 A | 2/1983 | Pepper, Jr. |
| 4,388,453 A | 6/1983 | Finkelmann et al. |
| 4,496,482 A | 1/1985 | Totten et al. |
| 4,548,842 A | 10/1985 | Pohl |
| 4,678,283 A | 7/1987 | Kreuzer et al. |
| 4,730,904 A | 3/1988 | Pauluth et al. |
| 4,774,028 A | 9/1988 | Imai et al. |
| 4,844,986 A | 7/1989 | Karakelle et al. |
| 4,847,120 A | 7/1989 | Gent |
| 4,866,192 A | 9/1989 | Plueddemann et al. |
| 4,940,602 A | 7/1990 | Taniguchi et al. |
| 4,954,153 A * | 9/1990 | Coleman et al. ............ 65/60.53 |
| 4,985,286 A | 1/1991 | Kurita et al. |
| 5,266,222 A | 11/1993 | Willis et al. |
| 5,281,365 A * | 1/1994 | Sohn et al. .................. 252/520 |
| 5,437,817 A | 8/1995 | Kondou et al. |
| 5,528,376 A * | 6/1996 | Inoue et al. ................. 358/296 |
| 5,668,576 A * | 9/1997 | Ikura et al. .................. 345/173 |
| 5,728,416 A * | 3/1998 | Bono et al. .................. 426/113 |
| 5,907,663 A * | 5/1999 | Lee ............................. 392/407 |

FOREIGN PATENT DOCUMENTS

| | | |
|---|---|---|
| GB | 1386876 | 3/1975 |
| GB | 1433303 | 4/1976 |
| GB | 1561735 A * | 2/1980 |

OTHER PUBLICATIONS

J. Harrison and S. Perry, Friction in the Presence of Molecular Lubricants and Solid/Hard Coatings, MRS Bulletin 1998.
Frederic J. Kahn, "Orientation of liquid crystals by surface coupling agents", American Institute of Physics 1973 vol. 22, No. 8.
U.S. application No. 09/169,391, Huang et al., filed Oct. 9, 1998.

* cited by examiner

*Primary Examiner*—Michael Barr
(74) *Attorney, Agent, or Firm*—Robert J. Pechman

(57) ABSTRACT

A method of applying a protective coating to a touch screen panel. A coating material which cures at an elevated temperature is applied to a touch screen panel on at least one surface thereof. The panel is then heated to a temperature which does not adversely affect the panel by irradiating the panel imparting energy to the coating material to more fully cure the coating material in a shorter time period without damaging the panel.

14 Claims, 1 Drawing Sheet

APPLY COATING MATERIAL — 20

↓

HEAT AND IRRADIATE — 22

METHOD OF APPLYING A PROTECTIVE COATING TO A TOUCH SCREEN PANEL

FIELD OF THE INVENTION

This invention relates to a method of applying a protective coating to a touch screen panel and in particular to using infrared radiation to more fully densify the protective coating.

BACKGROUND OF THE INVENTION

Touch screens are now ubiquitous and used as the input and display interface at, for example, automatic teller machines, gambling machines in casinos, cash registers, and the like.

To protect the substrate of the touch screen from scratches, a protective coating is often applied to the substrate in liquid form and then cured in an oven.

One problem with preferred coating compositions, however, is that the temperature at which they undergo full curing can not be tolerated by the glass substrate of the touch screen panel.

For example one protective coating composition cures at about 800° C. and yet the maximum temperature the glass substrate can withstand is about 550° C. before it experiences thermal damage.

To compensate, the protective coating is "cured" in an oven set at a temperature lower than specified but for an extremely long period of time.

The result is that the protective coating never reaches fill densification, is often not properly bonded to the substrate, and does not offer optimum abrasion resistance. Also, the cost of the touch screen increased due to the long dwell time required for the curing step where the protective coating is densified.

SUMMARY OF THE INVENTION

It is therefore an object of this invention to provide an improved method of forming a coating on a touch screen panel.

It is a further object of this invention to provide such a method in which the protective coating achieves a higher level of densification.

It is a further object of this invention to provide such a method in which the protective coating achieves a higher level of densification without subjecting the glass substrate and/or the conductive coating thereon of the touch screen panel to thermal damage.

It is a further object of this invention to provide such a method which results in optimum abrasion resistance for the touch screen panel.

It is a further object of this invention to provide such a method which reduces the curing time of the protective coating and thus the cost of touch screen panels.

It is a further object of this invention to provide such a method which insures the protective coating is properly bonded to the touch screen panel substrate.

This invention results from the realization that a higher level of densification and a more abrasion resistant touch screen panel can be manufactured in a shorter period of time without damaging the panel by irradiating the coating material with infrared radiation which better cures the coating material and yet does not raise the temperature of the panel to a temperature which would cause it thermal damage.

This invention features a method of applying a protective coating to a touch screen panel. The method comprises applying to a touch screen panel on at least one surface thereof a coating material which cures at an elevated temperature; heating the panel to a temperature which does not adversely affect the panel by irradiating the panel imparting energy to the coating material to more fully cure the coating material in a shorter time period without damaging the panel.

The preferred coating material is a silicate polymer solution. The step of applying the coating material is typically performed by spin coating, dip coating, spray coating, meniscus coating, flow coating, screen printing, or roll coating. Irradiating is preferably accomplished by infrared radiation sources which emit radiation at wavelengths in the range of between 2.5 and 6.0 microns.

The silicate polymer solution is preferably a silicate solution synthesized from the hydrolysis and condensation of silicon alkoxides. The silicate polymer solution may include sodium acetate, water, tetraethoxysilane, methyltriethoxysilane, isopropanol, and ethanol.

The infrared radiation source may be an array of externally wound quartz heater tubes but heating may include both irradiation and convective heating at the same time and in the same oven. Typically, heating takes place in an oven equipped with infrared heaters disposed over a conveyor which transports the coated touch screen panels. The oven may be equipped with externally wound quartz heater tubes for irradiating the touch screen panels with infrared radiation and further equipped with refractory heaters for convectively heating the touch screen panels.

BRIEF DESCRIPTION OF THE DRAWINGS

Other objects features and advantages will occur to those skilled in the art from the following description of a preferred embodiment and the accompanying drawings, in which.

DISCLOSURE OF THE PREFERRED EMBODIMENT

Figure 1:
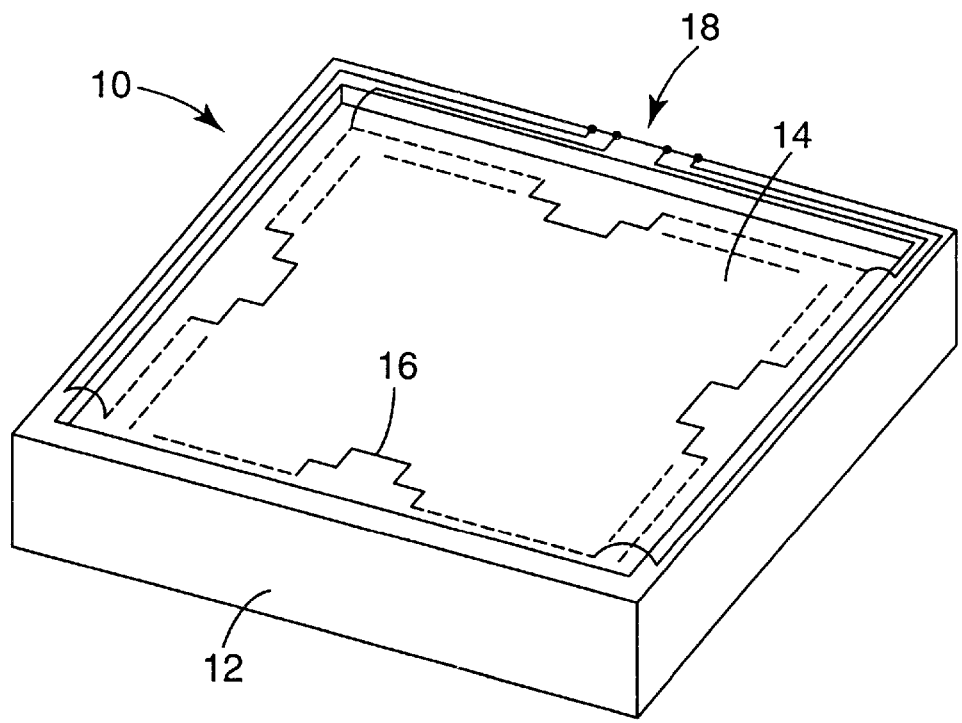
FIG. 1 is a schematic view of a typical touch screen panel.

Touch screen panel 10, FIG. 1 includes glass substrate 12 with a resistive coating on surface 14 thereof, edge electrode pattern 16, and wiring harness 18 connected to control circuitry that detects where on surface 14 a touch occurs by a person's finger or a stylus.

U.S. Pat. Nos., 4,198,539; 4,293,734; and 4,371,746 are incorporated herein by this reference as background information regarding touch screen technology.

The applicant is the owner of U.S. patent application Ser. No. 09/169,391 incorporated herein by this reference directed to an improved edge electrode pattern and the applicant is the owner of co-pending applications directed to improvements in wiring harnesses for touch screen panels and these co-pending applications are also incorporated herein by this reference.

The focus of the present invention concerns applying a protective coating to at least the active area of panel 10. Typically, however, the protective coating is applied to all of surface 14 by spin coating, dip coating, spray coating, meniscus coating, flow coating, screen printing, or roll coating.

The preferred coating compound is a silicate polymer solution derived by the "sol-gel" process. The preferred silicate polymer solution is a so-called "sol-gel" silicate solution synthesized from the hydrolysis and condensation of silicon alkoxides. (See for example C. J. Brinker and G. W. Scherer, "Sol-Gel Science", Academic Press, 1990.)

In the preferred embodiment, a one gallon quantity of the coating solution is prepared by first adding a mixture of 4 g of sodium acetate and 411 g water to a mixture of 937 g tetraethoxysilane (Dynasil A, Huls America), 535 g methyltriethoxysilane (Dynasilan MTES, Huls America), 350 g isoproponal, and 50 g ethanol. Next, 4 g nitric acid is added to catalyze the reaction. Finally, 375 g isoproponal is added after the reaction is complete (2 hours later).

This material must be heated to a temperature of about 800° C. to fully densify it but temperatures above about 550° C. damage panel 10 and a particular glass substrate 12 and/or the conductive coating thereon.

So, in accordance with a previous method employed by the applicant hereof, each coated panel was fired in a standard oven at a peak temperature of about 550° C. for 30 minutes or more. This curing step is used to form a dense three-dimensional film structure by thermally inducing self-condensation reactions within the coating material which removes hydroxide groups from the remaining silanol molecules and bonds the structure together to the underlying substrate. The prior art curing step was done in a batch process within an electrical resistance element or gas fired oven with total cycle times ranging from 1½ to 3 hours duration. Pursuant to the prior art method, the substrate glass material was heated to the same temperature as the coating material due to the indiscriminate nature of the heating.

The resulting panel was adequate but not optimal since, as stated in the Background section above, the protective coating never reaches an optimal or adequate level of densification and was often not properly bonded to the substrate. Thus, the protective coating did not offer optimum abrasion resistance and, moreover, the cost of the touch screen panels increased due to the long dwell time required for the curing step where the protective coating is densified.

Figure 2:
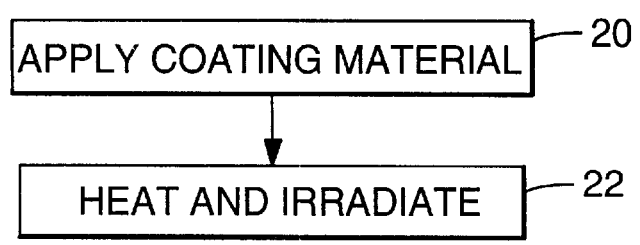
FIG. 2 is a flow chart showing the primary manufacturing steps associated with the method of the subject invention.

In the subject invention, the silicate polymer solution is applied to the touch screen panel as delineated above, step 20, FIG. 2, but then subjected to infrared radiation, step 22 in a chamber equipped with infrared lamps or externally wound heater tubes emitting infrared radiation in the 2.5–6.0 micron spectrum.

The use of infrared radiation introduces more energy into the coating while at the same time reducing the thermal exposure of the glass substrate.

Through experimentation it was determined that the coated touch screen substrates exposed to infrared radiation emitted in the 2.5–6.0 micron wavelength spectrum exhibited attributes of a functionally more durable coating. This phenomenon is believe to be caused by vibrational motion being induced in the organic bonds of the coating material and the exposure to the infrared radiation allows the coating material/substrate interface to preferentially receive, where it is needed, a higher effective energy input than the bulk glass substrate.

In this way, the protective coating is more fully cured and densified in a shorter time period than was possible according to prior art methods. Moreover, adhesion between the coating and the substrate is improved. In contrast with prior art methods of curing Sol-Gel coatings with high temperature exposures for a long time duration to achieve proper densification, curing in accordance with the subject invention can be performed with a lower thermal exposure for a shorter time duration. This allows the application of the Sol-Gel coating on glass substrates and conductive coatings that would not have tolerated the thermal exposure required to cure the coatings in accordance with the prior art.

In accordance with this invention, the curing method lends itself to high-volume, low-cycle time manufacturing processes with a throughput increase over prior art curing processes.

A conveyor oven was equipped with banks of externally wound heater tubes over the conveyor belt which transports the coated touch screen panels through the oven. The present invention lends itself, but is not limited to use in conveyorized manufacturing processes. A conveyor furnace was equipped with an array of externally wound quartz heater tubes produced by the Casso Solar, Corp., Pomona, N.Y. mounted three inches above the pass line of the conveyor belt. Ceramic refractory heaters, type "FHT" of the same manufacturer, were installed three inches below the furnace pass line. These lower heaters were used primarily to offset the thermal mass of the stainless steel conveyor belt and also to provide some convection heating of the touchscreen panels. The top mounted externally wound heater tube array was divided into five longitudinal control zones with each longitudinal zone further divided into four lateral zones. Each zone is controlled by a programmable logic controller which receives input signal from a discrete thermocouple in each zone. The total length of the curing section of this oven was 246 inches. Infrared radiation emission of the externally wound quartz heater tubes was determined by measuring the heater tube wire surface temperature with an optical pyrometer and correlating that temperature to an emissivity value.

With the present invention, coated panels can be successfully cured with peak surface temperatures of only 420–538° C. achieved for a period of one to two minutes by controlling some or all of the top mounted externally wound heater tubes to emit infrared radiation in the 2.6–6.0$\mu$ electromagnetic spectrum. Coated panels processed in the furnace receive convective thermal energy from the top and bottom heater arrays. Additionally, the coating material on the panel is able to directly absorb photon energy emitted by the top mounted externally wound heater tubes to its structural network and it is further believed that photon energy is also reflected back through the coating material by the transparent conductive oxide that lies beneath the sol-gel coating material and on top of the glass substrate.

Touch screen panels coated with a silicate polymer solution and subjected to infrared radiation with wavelengths less than 2.5 microns averaged between 96,694–120,625 eraser rub cycles while in contrast panels subjected to infrared radiation with wavelengths between 2.6 and 6.0 microns averaged between 139,779–263,118 eraser rub cycles. Rub testing is a method of measuring the abrasive wear resistance of touchscreen protective coatings. The test is based on the severe abrasion test detailed in military specification MIL-C-675C. This test employs a pencil eraser (Mil-E-12397B) which is loaded with 2.0–2.5 pounds of force and fixtured to rub with reciprocal motion along a one inch path on the coated touchscreen surface. The end point of the test is determined by "finger drawing" a line, with the finger adjacent to the rub test pattern and measuring percentage deviation in the input signal from the actual. The rub test performance is rated in total number of reciprocating strokes. The rub test is an indicator of coating/substrate adhesion and coating stress and acts as an indirect predictor of field durability. A Faber abraser test also proved that wavelengths between 2.6 and 6.0 microns result in significantly more abrasion resistant panels.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A method of applying a protective coating to a touch screen panel, the method comprising:

applying to a touch screen panel on at least one surface thereof a coating material which cures at a temperature above 500° C.; and heating the panel to a temperature which does not cause thermal damage to the panel by irradiating the panel with infrared energy having wavelength of between 2.5–6.0 microns and imparting energy to the coating material to more ally cure the coating material in a shorter time period than in the absence of irradiation and without damaging the panel.

2. The method of claim 1 in which the coating material is a silicate polymer solution.

3. The method of claim 2 in which the silicate polymer solution is a silicate solution synthesized from the hydrolysis and condensation of silicon alkoxides.

4. The method of claim 3 in which the silicate polymer solution includes sodium acetate, water, tetraethoxysilane, methyltriethoxysilane, isopropanol, and ethanol.

5. The method of claim 1 in which the step of applying the coating material is performed by the class of methods selected from the group consisting of spin coating, dip coating, spray coating, meniscus coating, flow coating, screen printing, and roll coating.

6. The method of claim 1 in which irradiating is accomplished by an infrared radiation source.

7. The method of claim 6 in which the infrared radiation source is an array of externally wound quartz heater tubes.

8. The method of claim 6 in which the infrared radiation source emits radiation at wavelengths in the range of between 2.5 and 6.0 microns.

9. The method of claim 1 in which heating includes both irradiation and convective heating at the same time and in the same oven.

10. The method of claim 1 in which heating takes place in an oven equipped with infrared heaters disposed over a conveyor which transports the coated touch screen panels.

11. The method of claim 10 in which the oven is equipped with externally wound quartz heater tubes for irradiating the touch screen panels with infrared radiation and further equipped with refractory heaters for convectively heating the touch screen panels.

12. A method of applying a protective coating to a touch screen panel, the method comprising:

applying to a touch screen panel on at least one surface thereof a coating material which cures at an elevated temperature;

heating the panel to a temperature which does not cause thermal damage to the panel by irradiating the panel and imparting energy to the coating material to more filly cure the coating material in a shorter time period than in the absence of irradiation and without damaging the panel; and wherein said heating takes place in an oven equipped with infrared heaters disposed over a conveyor which transports the coated touch screen panels, and wherein said oven is further equipped with refractory heaters for convectively heating the touch screen panels.

13. A method of applying a protective coating to a touch screen panel, the method comprising:

applying to a touch screen panel on at least one surface thereof an abrasion resistant coating material which cures at an elevated temperature; and heating the panel to a temperature which does not cause thermal damage to the panel by irradiating the panel with infrared radiation to impart energy to the coating material to more fully cure the coating material in 1–2 minutes than without infrared radiation and without damaging the panel.

14. A method of applying an abrasion resistant protective coating to a touch screen panel, the method comprising:

applying to a glass substrate a resistive layer and, on a periphery of the resistive layer, an edge electrode pattern;

applying over the resistive layer an abrasion resistant protective coating material including a silicate polymer solution which densites at a temperature of above about 500° C.; and irradiating the panel with infrared radiation having a wavelength of between 2.5 and 6.0 microns to heat the panel to a temperature which does not cause thermal damage to the panel and yet imparting energy to the protective coating material to more fully cure and densify the protective coating material in a shorter time period than in the absence of radiation and without damaging the panel.

* * * * *

UNITED STATES PATENT AND TRADEMARK OFFICE
CERTIFICATE OF CORRECTION

PATENT NO.   : 6,406,758 B1
DATED        : June 18, 2002
INVENTOR(S)  : Richter, Paul J.

It is certified that error appears in the above-identified patent and that said Letters Patent is hereby corrected as shown below:

<u>Column 5,</u>
Line 20, delete the word "ally" and insert in place thereof -- fully --.

<u>Column 6,</u>
Line 12, delete the word "filly" and insert in place thereof -- fully --.

Signed and Sealed this

Fourteenth Day of January, 2003

JAMES E. ROGAN
*Director of the United States Patent and Trademark Office*